(12) United States Patent
Abe

(10) Patent No.: US 8,085,425 B2
(45) Date of Patent: Dec. 27, 2011

(54) INFORMATION PROCESSING APPARATUS

(75) Inventor: Koichi Abe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 285 days.

(21) Appl. No.: 12/108,963

(22) Filed: Apr. 24, 2008

(65) Prior Publication Data

US 2008/0231900 A1  Sep. 25, 2008

Related U.S. Application Data

(62) Division of application No. 10/461,482, filed on Jun. 16, 2003, now abandoned.

(30) Foreign Application Priority Data

Jun. 19, 2002 (JP) ................................ 2002-179092
Jan. 6, 2003 (JP) ................................ 2003-000674

(51) Int. Cl.
*G06K 15/00* (2006.01)
(52) U.S. Cl. ........................................ 358/1.16
(58) Field of Classification Search ........ 358/1.13–1.16; 455/99, 550.1
See application file for complete search history.

(56) References Cited

U.S. PATENT DOCUMENTS

| 5,528,734 A | 6/1996 | Sanchez |
| 5,898,824 A | 4/1999 | Kato et al. |
| 6,131,040 A | 10/2000 | Knuutila et al. |
| 6,243,542 B1 | 6/2001 | Fujimoto et al. |
| 6,424,658 B1 * | 7/2002 | Mathur .................. 370/429 |
| 6,892,299 B2 | 5/2005 | Abe |
| 7,084,999 B2 | 8/2006 | Abe |
| 7,110,728 B2 | 9/2006 | Mizui et al. |
| 2002/0044295 A1 | 4/2002 | Tanaka |

FOREIGN PATENT DOCUMENTS

| JP | 4-186961 | 7/1992 |
| JP | 5-108281 | 4/1993 |
| JP | 7-121318 | 5/1995 |
| JP | 7-325678 | 12/1995 |
| JP | 11-065788 | 3/1999 |
| JP | 2000-168198 | 6/2000 |
| JP | 2000-322501 | 11/2000 |
| JP | 2002-189574 | 7/2002 |

OTHER PUBLICATIONS

Office Action, dated Jun. 6, 2008, in JP 2003-000674.

* cited by examiner

*Primary Examiner* — Twyler Haskins
*Assistant Examiner* — Lennin Rodriguez
(74) *Attorney, Agent, or Firm* — Fitzpatrick, Cella, Harper & Scinto

(57) ABSTRACT

The present invention allows a printing process to be released from application software earlier. At the start of printing, the size of an available area in a RAM 11 is obtained. It is determined whether or not the size of total print data transmitted from a handheld computer to a color printer is the obtained size of the available area. If it is determined that the size of the total print data is larger, the size of an available area in a memory card is obtained. It is then determined whether or not the obtained size of the available area is larger than the size of the total print data. If it is determined that the size of the available area is larger, the total print data is created on the available area in the memory card. Then, the created total print data is transmitted to the color printer.

12 Claims, 14 Drawing Sheets

INFORMATION PROCESSING APPARATUS

CROSS-REFERENCE TO RELATED APPLICATIONS

This application is a divisional application of co-pending application Ser. No. 10/461,482, filed Jun. 16, 2003, which is incorporated herein by reference.

This application claims priority from Japanese Patent Application Nos. 2002-179092 filed Jun. 19, 2002 and 2003-000674 filed Jan. 6, 2003, which are incorporated hereinto by reference.

BACKGROUND OF THE INVENTION

1. Field of the Invention

The present invention relates to an information processing apparatus in a printing system composed of this information processing apparatus and a printing apparatus.

2. Description of the Related Art

A printing system has hitherto been known which comprises a personal computer as a host to which peripheral equipment such as a printing apparatus (printer) capable of execute printing is connected. In the printing system, any application software on the personal computer can cause the printing apparatus to execute printing.

In this printing system, when the application software causes the printing apparatus to execute printing, print data is created as a temporary file. Once the file is completed, the personal computer transmits the print data from this file to the printing apparatus. The printing apparatus then executes printing. Since the printing process can be released from the application software once the temporary file is completely created, the application software can subsequently perform arbitrary operations.

Such a printing process is generally called "spool printing". In this case, the size of the temporary file corresponds to several dozen to hundred MB of data. Typically, the personal computer comprises a hard disk drive that is a mass storage device that can store several GB of data. The temporary file is created in this hard disk drive. This prevents the situation in which the temporary file cannot be created owing to the insufficiency of an empty area in the hard disk drive.

Such a known printing system is disclosed in, for example, Japanese Patent Application Laid-open Nos. 05-108281, 07-325678, or 2000-168198.

On the other hand, a simplified personal computer (hereinafter also referred to as a "handheld computer") is known which does not have any mass storage devices such as a hard disk drive. The handheld computer comprises a RAM (Random Access Memory) that can store about several dozen MB. In a printing system having this handheld computer and a printing apparatus, if spool printing is executed, a temporary file for print data is created in the RAM. Consequently, the file is often larger than the empty area in the RAM. As a result, the temporary file cannot be created.

Thus, many handheld computers are configured to directly print all the print data. Specifically, they do not create any temporary files but sequentially transmit part of the print data delivered by application software, to the printing apparatus for printing. However, the printing process cannot be released from the application software until all the print data is transmitted from the handheld computer to the printing apparatus. As a result, it takes a very long time to release the printing process. During this time, the user cannot operate application software.

Further, in handheld computers not configured to directly print all the print data, the empty area in the RAM may run short to prevent the file from being completed. In this case, although the file is partially created, the printing operation is aborted with an error when the empty area becomes insufficient to create the rest of the file. Although the user has been waiting for the printing operation to be finished, the operation is aborted with an error with no print data printed.

For example, Japanese Patent Application Laid-open No. 2002-189574 discloses a known printing system that solves the above problem. This printing system compares the file size of print data with the empty area in the RAM. If the empty area in the RAM is larger, spool printing is executed. Otherwise, direct printing is executed by sequentially transmitting print data.

However, if the file is often larger than the empty area in the RAM, this printing system creates substantially the same problem as that with the above described printing system configured to directly print all the print data. Specifically, if the empty area in the RAM frequently runs short, almost all the data is directly printed. Consequently, the printing process cannot be released from the application software until all the print data is transmitted from the handheld computer to the printing apparatus.

SUMMARY OF THE INVENTION

It is an object of the present invention to solve the above problems to provide an information processing apparatus that can release a printing process from application software earlier.

To accomplish this object, the present invention provides an information processing apparatus which has storage means and removable external storage means and to which a printing apparatus printing print data is connected, the information processing apparatus comprising first obtaining means for obtaining the size of an available area in the storage means at the start of printing, first determining means for determining whether or not the size of total print data transmitted from the information processing apparatus to the printing apparatus is larger than the size of the available area in the storage means obtained by the first obtaining means, second obtaining means for obtaining the size of an available area in the external storage means if the first determining means determines that the size of the total print data is larger than the size of the available area in the storage means, second determining means for determining whether or not the size of the available area in the external storage means obtained by the second obtaining means is larger than the size of the total print data, and processing means for creating the total print data on the available area in the external storage means and transmitting the created total print data to the printing apparatus if the second determining means determines that the size of the available area in the external storage means is larger than the size of the total print data.

With this arrangement, if the empty area in the storage means runs short, a spool file is stored in the external storage means. Thus, spool printing can be normally executed. Consequently, the printing process can be released from application earlier. Arbitrary operations can then be performed on the application while a print job is being run in a background.

If the second determining means determines that the size of the total print data is larger than the size of the available area in the external storage area, the processing means can create part of the total print data on the available area in the storage means and then transmit the created print data to the printing apparatus.

With this arrangement, the application can be operate more easily and efficiently. Further, the user can perform a printing operation more easily and efficiently. In all cases, a printing operation can be normally completed.

After transmitting print data to the printing apparatus, the processing means can repeat a process of creating a next part of the total print data and then transmitting the created print data to the printing apparatus. With this arrangement, it is only necessary to provide an area required for a printing process within the range of the available area in the storage means of the information processing apparatus. Therefore, this arrangement can be easily accomplished.

The information processing apparatus may comprise second display control means for displaying a message indicating that the available area in the external storage means is insufficient if the second determining means determines that the size of the total print data is larger than the size of the available area in the external storage means. With this arrangement, the user can easily determine the status of the available area in the external storage means connected to the information processing apparatus.

The second display control means may display a continuance selection button and a halt selection button and may further comprise continuing means for creating, in response to selection of the continuance selection button, part of the total print data on the available area in the storage means and transmitting the created print data to the printing apparatus to continue a printing process, and halting means for halting the printing process in response to selection of the halt selection button. With this arrangement, the printing process can be continued or suspended.

If the first determining means determines that the size of the available area in the storage means is larger than the size of the total print data, the processing means may create the total print data on the available area in the storage means and then transmit the created total print data to the printing apparatus.

The total print data may have a print instruction for directly controlling the printing apparatus or an intermediate print command that can create a print instruction.

This arrangement can be easily accomplished by writing, in a spool file, print data that enables the printer to be directly controlled or intermediate data required for an intermediate process for print image data delivered by application and the print data. The intermediate print command can reduce the file size of the spool file.

The information processing apparatus may comprise first display control means for displaying a message indicating that the available area in the storage means is insufficient if the first determining means determines that the size of the total print data is larger than the size of the available area in the storage means. With this arrangement, the user can easily determine the status of the available area in the storage means of the information processing apparatus.

The first display control means may display a continuance selection button and a halt selection button and may further comprise continuing means for checking, in response to selection of the continuance selection button, the size of the available area in the storage means to continue a printing process, and halting means for halting the printing process in response to selection of the halt selection button. With this arrangement, the printing process can be continued or suspended.

The information processing apparatus may comprise arbitrating means for giving top priority to determination made by the first determining means if concurrent determinations are made by the first and second determining means.

Alternatively, the information printing apparatus comprises first obtaining means for obtaining the size of an available area in the storage means at the start of printing, first determining means for determining whether or not the size of total print data transmitted from the information processing apparatus to the printing apparatus is larger than the size of the available area in the storage means obtained by the first obtaining means, second obtaining means for obtaining the size of an available area in the external storage means if the first determining means determines that the size of the total print data is larger than the size of the available area in the storage means, second determining means for determining whether or not the size of the available area in the external storage means obtained by the second obtaining means is larger than the size of the total print data, total size obtaining means for obtaining the total size of the size of the available area in the storage and the size of the available area in the external storage means if the second determining means determines that the size of the total print data is larger than the size of the available area in the external storage means, third determining means for determining whether or not the total area size obtained by the total size obtaining means is larger than the size of the total print data, and processing means for utilizing the available area in the storage means or the available area in the external storage means to create the total print data as divided total print data composed of a plurality of data groups and transmitting the created divided total print data to the printing apparatus if the third determining means determines that the total area size is larger than the size of the total print data.

If the third determining means determines that the size of the total print data is larger than the total area size, the processing means can utilize the available area in the storage means to create part of the total print data and transmit the created print data to the printing apparatus.

The information processing apparatus may comprise third display control means for displaying a message indicating that the available area in the storage means or the external storage means is insufficient if the third determining means determines that the size of the total print data is larger than the total area size. With this arrangement, the user can easily determine the status of the available area in the storage means of the information processing apparatus or in the external storage means connected to the information processing apparatus.

The third display control means may display a continuance selection button and a halt selection button and may further comprise continuing means for creating, in response to selection of the continuance selection button, part of the total print data on the available area in the storage means and transmitting the created print data to the printing apparatus to continue a printing process, and halting means for halting the printing process in response to selection of the halt selection button.

The information processing apparatus may comprise arbitrating means for giving top priority to determination made by the first determining means if concurrent determinations are made by the first and third determining means.

The divided total print data has a first data group created utilizing the available area in the storage means and a second data group created utilizing the available area in the external storage means. The processing means can give higher priority to the first data group than to the second data group in transmitting the divided total print data to the printing apparatus.

In transmitting the divided total print data to the printing apparatus, the processing means transmits the first data group, then moves part or all of the data from the second data group to the storage means to create a new data group, and transmit the created new data group to the printing apparatus.

Furthermore, the information processing apparatus comprises total size obtaining means for obtaining the total size of the size of the available area in the storage and the size of the available area in the external storage means, determining means for determining whether or not the total area size obtained by the total size obtaining means is larger than the size of the total print data transmitted from the information processing apparatus to the printing apparatus, and processing means for creating the total print data in the available area in the storage means or in the available area in the external storage means as divided total print data composed of a plurality of data groups and transmitting the divided total print data to the printing apparatus if the determining means determines that the total area size is larger than the size of the total print data.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Embodiment 1

Figure 1:
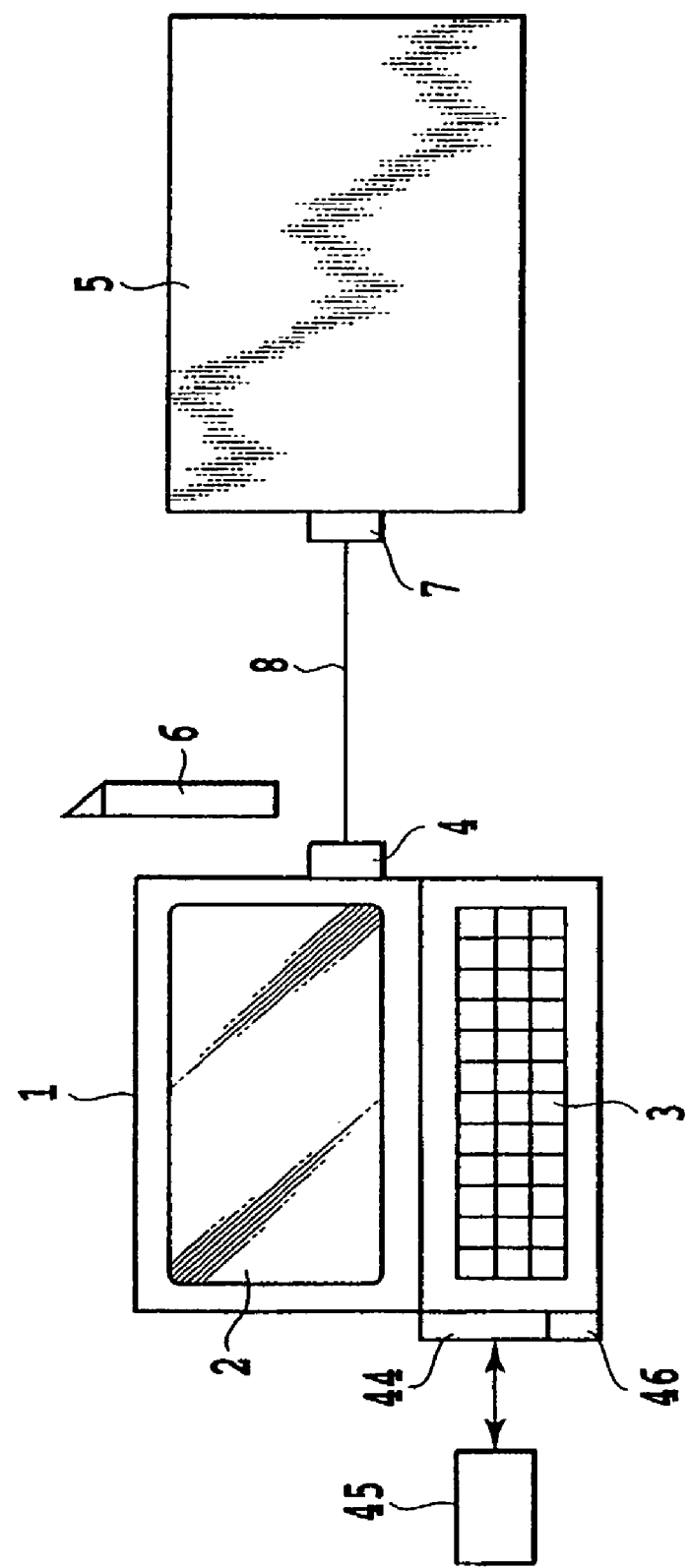
FIG. 1 is a block diagram showing a printing system according to an embodiment of the present invention.

FIG. 1 shows a printing system according to an embodiment of the present invention. A handheld computer 1 is provided with Microsoft Windows (registered trade mark) CE as an operating system. The handheld computer 1 comprises a liquid crystal display 2, a keyboard 3, and a USB (Universal Serial Bus) port (host) 4. The liquid crystal display 2 is a touch panel. Functions similar to those of a mouse for a personal computer are implemented by using a stylus pen 6 to a drag, drop, tap, and other operations. An ink jet-based color printer 5 has a USB port (client) 7. The handheld computer 1 and the printer 5 are connected together via a USB cable 8 to communicate data between these apparatuses.

A memory card 45 is external storage means used in place of a hard disk drive. It is used with storage means such as a RAM to implement a portable and inexpensive information processing apparatus. The memory card 45 can mainly store application software and files. The memory card 45 generally has a capacity of 1 GB and is used for spool printing (described later) executed by the printing system. The memory card 45 can be installed in a card slot 44 having an installation and removal switch 46 used to allow the memory card 45 to be installed or removed. By operating the installation and removal switch 46, a user can freely install the memory card in the card slot 44 in the handheld computer 1 or remove it from the card slot 44. Further, the OS mounted in the handheld computer 1 can recognize the status of the installation and removal switch 46 to identify the installation or removal status of the memory card 45 (the presence or absence of the memory card 45). FIG. 1 shows that the memory card 45 has been removed.

Figure 2:
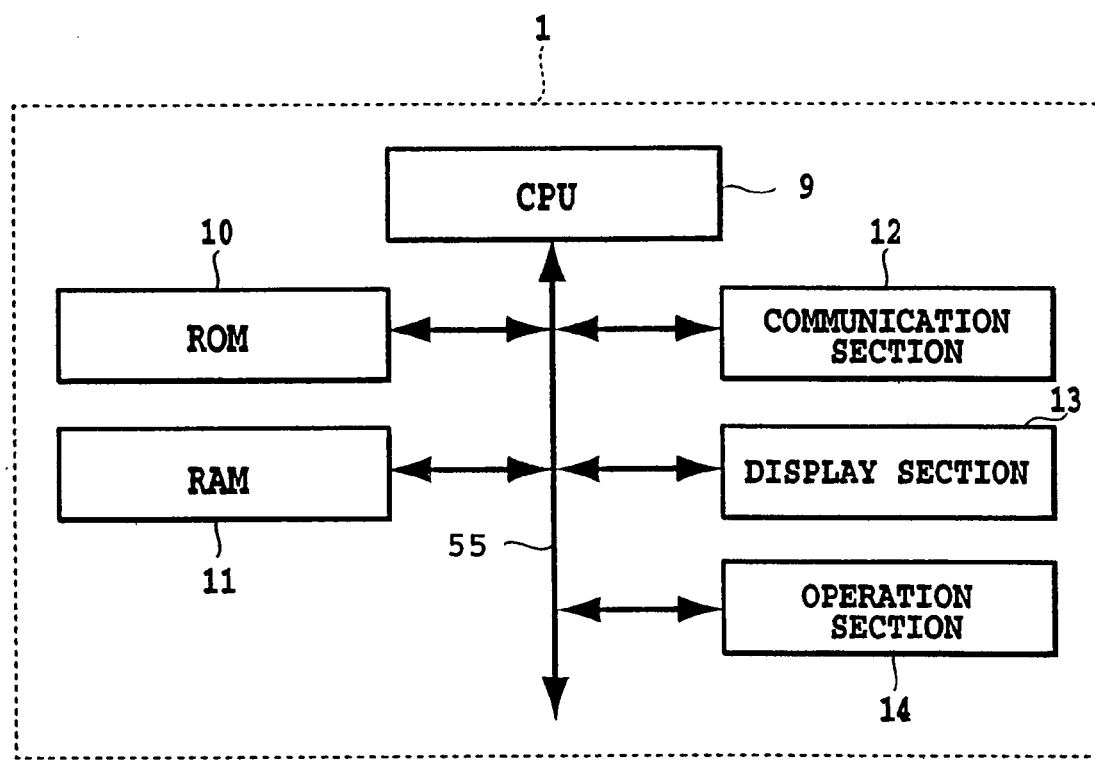
FIG. 2 is a block diagram showing a configuration of a handheld computer according to this embodiment of the present invention.

FIG. 2 shows a configuration of the handheld computer 1 shown in FIG. 1. The handheld computer 1 is a portable terminal utilized as a simplified personal computer. The handheld computer 1 is principally characterized in that it does not comprises any mass storage devices such as a hard disk drive (devices that can typically store several GB of data) but comprises a RAM 11 as storage means and the memory card 45 as external storage means. Typically, a shorter time is required for writes, reads, or other accesses to the RAM 11 than for similar accesses to the memory card 45.

The handheld computer 1 has a CPU (Central Processing Unit) 9 composed of a microprocessor or the like, a ROM (Read Only Memory) 10, a RAM 11, a communication section 12, a display section 13, and an operation section 14. These components are connected together via an address data bus 21.

The ROM 10 stores the OS, various device drivers that control a display and a port, applications that can be activated on the handheld computer 1, and the like. The CPU 9 controls the RAM 11, the communication section 12, the display section 13, and the operation section 14 in accordance with programs stored in the ROM 10. The ROM 10 stores a printer driver 20 (described later with reference to FIG. 4). The RAM 11 is typically configured to have a capacity of about 32 MB. The half of this capacity is assigned for the execution of the programs, whereas the other half is assigned for the storage of data. The communication section 12 includes the USB port 4 to control USB communications. The display section 13 includes the liquid crystal display 2 to control the display of a user interface (hereinafter referred to as a "UI") for the applications or the like. The operation section 14 includes the keyboard 3 to control key inputs. The operation section 14 includes the installation and removal switch 46 to control the installation or removal status of the memory card 45.

Figure 3:
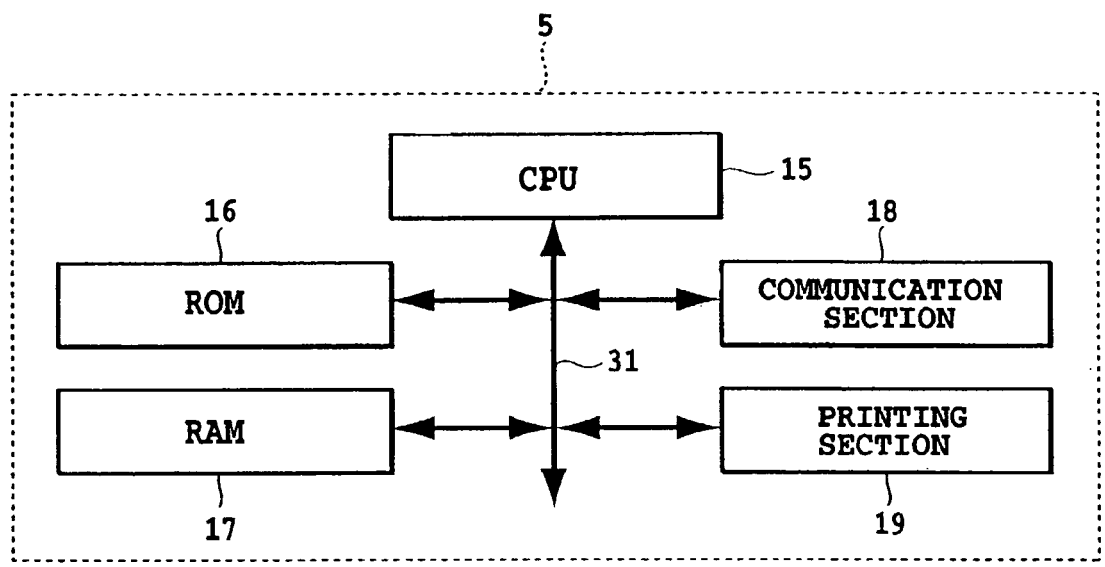
FIG. 3 is a block diagram showing a configuration of a printer according to this embodiment of the present invention.

FIG. 3 shows a configuration of the printer 5 shown in FIG. 1. The printer 5 has a CPU 15 composed of a microprocessor or the like, a ROM 16, a RAM 17, a communication section 18, and a printing section 19. These components are connected together via an address data bus.

The ROM 16 stores a program used by the printer 5 to perform a printing process in accordance with the control of the printer driver 20 running on the handheld computer 1. The CPU 15 controls the RAM 17, the communication section 18, and the printing section 19 in accordance with the programs stored in the ROM 16. The RAM 17 temporarily stores print data mainly transmitted by the handheld computer 1 and printed by the printing section 19. The communication section 18 includes the USB port 7 to control communications through the USB.

The printing section 19 is composed of an electric circuit including a printing unit composed of an ink jet-based print head, color inks, a carriage, a print sheet carrying mechanism, and the like, and an ASIC used to generate printing pulses in the print head on the basis of print data. In accordance with a printing operation performed by an application (described later with reference to FIG. 6) capable of executing printing, the display contents (image data) of a file opened by the application are converted into print data including control commands for the printer 5 via the printer driver 20. Subsequently, the print data is temporarily stored in a data storage area in the RAM 11 of the handheld computer 1. The data is then transmitted from the USB port 4 to the printer 5 via a USB interface. The printing section 19 converts the print data received by the printer 5, into printing pulses to execute printing on the basis of these pulses.

Figure 4:
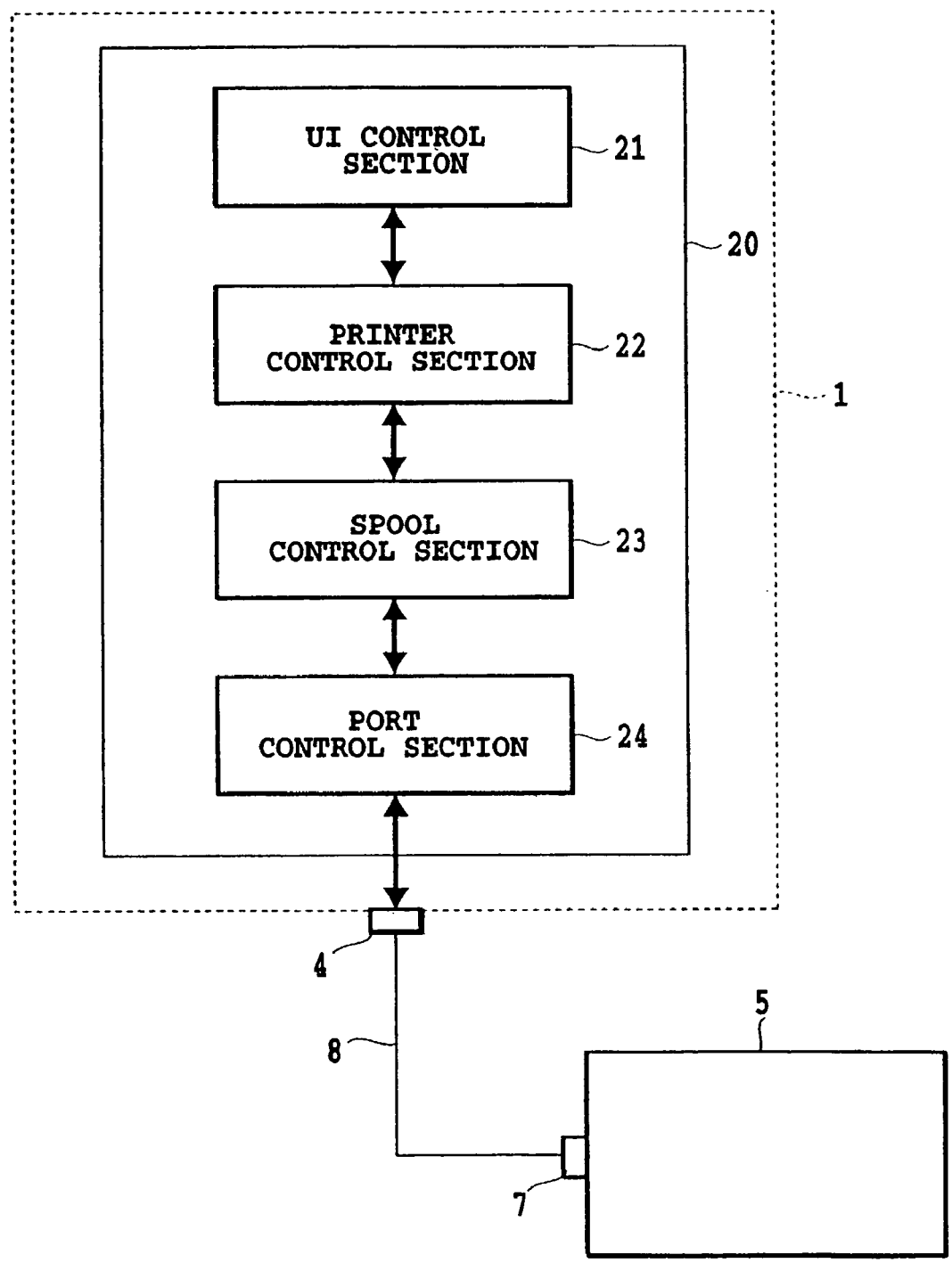
FIG. 4 is a block diagram showing a configuration of a printer driver according to this embodiment of the present invention.

FIG. 4 shows a configuration of the printer driver 20, which controls the printer 5. The arrows in FIG. 4 indicate the flow of data. A UI control section 21 controls the UI of the printer driver 20. A printer control section 22 controls the printer 5 by transmitting a control command to the printer 5 in accordance with an instruction from the UI control section 21. The printer control section 22 notifies the UI control section 21 of the status of the printer 5 on the basis of a response command from the printer 5.

A spool control section 23 converts image data delivered by an application, into print data when instructed on printing by the application. If there is a sufficient empty area in the RAM 11 of the handheld computer 1, the spool control section 23 temporarily stores the print data in the RAM 11 as a spool file. Once all the print data has been stored to complete the spool file, the printing process is released from the application. Then, in a background, the print data from the spool file is transmitted to the printer 5. The transmitted print data is used for a printing process by the printer 5.

On the other hand, if there is not a sufficient empty area in the RAM 11 of the handheld computer 1, it is checked whether or not the memory card 45 is present. If the memory card 45 is present (it is installed in the handheld computer 1) and has a sufficient empty area, the converted print data is temporarily stored in the memory card 45 as a spool file. Once all the print data has been stored to complete the spool file, the printing process is released from the application. In the background, the print data from the spool is transmitted to the printer 5. The transmitted print data is used for a printing process by the printer 5.

Thus, the term "spool printing" refers to a printing process of temporarily storing all the print data in the RAM 11 of the computer 1 or in the memory card 45 as a spool file and transmitting the print data from the spool file in the background. During the spool printing, arbitrary operations can be performed on the application.

In contrast, the term "direct printing" refers to a printing process of converting image data in rasters delivered by the application, into print data and sequentially transmitting the print data to the printer 5 in a foreground. In the direct printing, all the print data is not formed into a spool file or temporarily stored in the RAM or the like. During the direct printing, no operations can be performed on the application.

If the RAM 11 of the handheld computer 1 does not have a sufficient empty area and the memory card 45 has not been installed in the handheld computer 1 or if there is not a sufficient empty area even though the memory card 45 has been installed, then the spool control section 23 executes a direct printing process instead of a spool printing process.

The print data in the spool file for the spool printing or the print data for the direct printing may be organized in two manners. One of them is to use a print command that can directly control the printer 5. The other is to use an intermediate print command required for an intermediate process for print image data delivered by the application and print commands. The print command contains a large amount of data and thus requires the spool file to have a large size. However, it only requires print data to be transferred to the printer 5, thus increasing processing speed. The intermediate print command contains a smaller amount of data than the print command and does not require the spool file to have a large size. However, the intermediate print command is converted into a print command before the latter is transferred to the printer 5. Accordingly, the processing speed of the spool printing decreases.

For the command used to organize print data, it is recommended that the optimum one of the print command and the intermediate print command be selected on the basis of the performance of the CPU in the system, the capacity of the RAM, and the like. In the present embodiment, description will be given of an example in which print data is organized using a print command.

A port control section 24 writes print data delivered by the spool control section 23, in the communication section 12, and reads a response command from the communication section 12, the response command having been transmitted by the printer 5. Further, the port control section 24 executes the control of the port as viewed mainly from the printer driver level.

Figure 5:
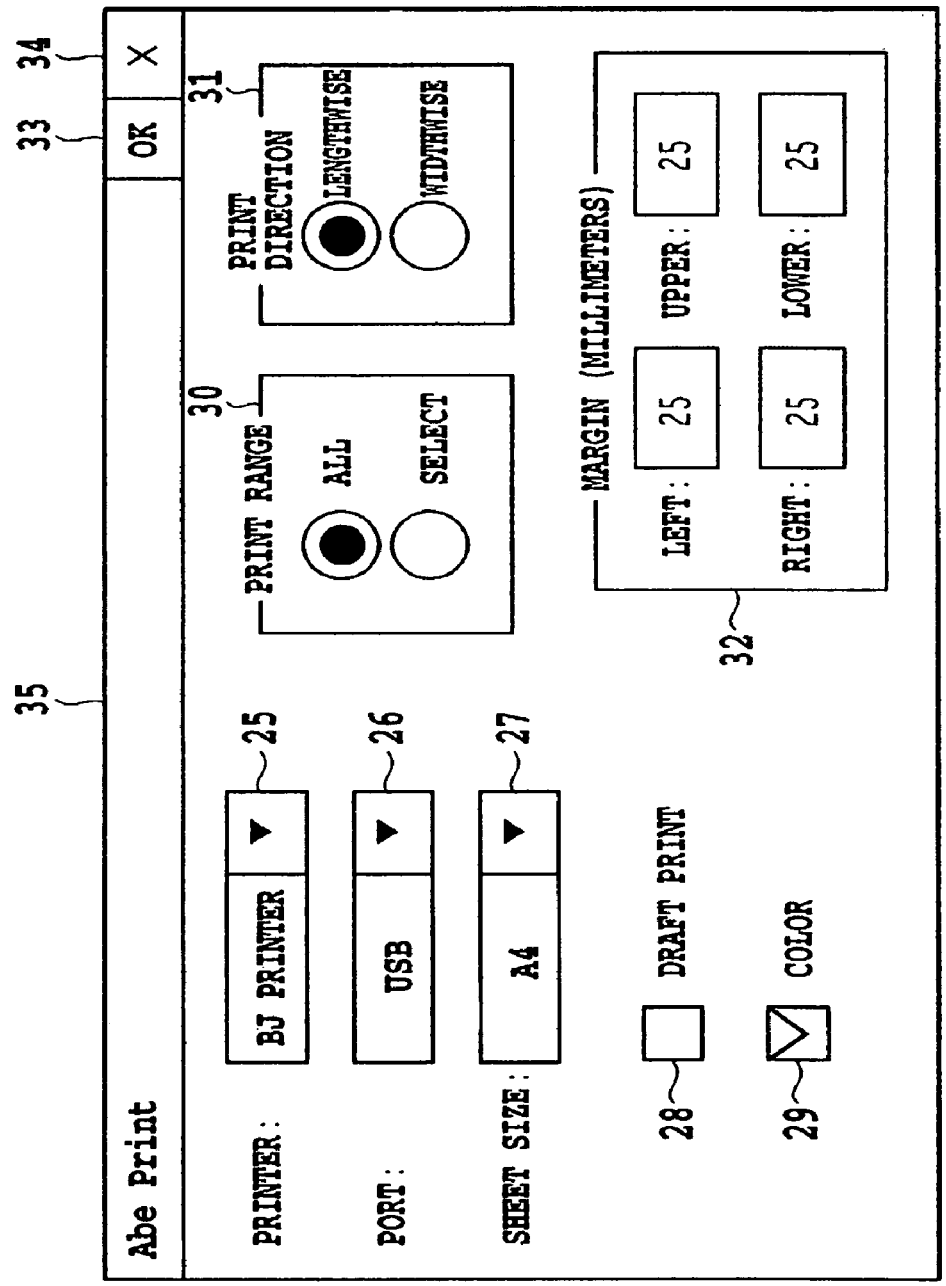
FIG. 5 is a view showing an example of a screen displayed on a liquid crystal display.

FIG. 5 shows an example of the UI shown on the liquid crystal display 2 of the handheld computer 1 when the printer driver 20 is activated. A printer section 25 in a main window 35 is composed of a combo box and allows a connected printer to be selected. In the example shown in FIG. 5, a "BJ printer" has been selected which can be used in the printer 5. A port selection section 26 is composed of a combo box and allows the selection of one of the ports which is provided in the handheld computer and which can be used for printing. In the example shown in FIG. 5, a USB port has been selected.

A sheet size selection section 27 is composed of a combo box and allows one of three types, i.e. A6, A5, and A4 to be selected as a sheet size. A draft print selection section 28 is composed of a check box. If this box is checked, a printing process is executed in a drift print grade that is lower than a standard grade. If this box is unchecked, a printing process is executed in a standard grade. In the example shown is FIG. 5, this box has been unchecked. A color print selection section 29 is composed of a check box. If this box is checked, color printing is executed. If this box is unchecked, monochrome printing is executed. In the example shown in FIG. 5, this box has been checked.

A print range selection section 30 is composed of a radio button. If "All" is selected, the entire range is selected regardless of an area selected on a display provided by the application. If "Select" is selected, the data in the area selected on the display provided by the application is printed. In the example shown in FIG. 5, "All" has been selected. A print direction selection section 31 is composed of a radio button. If "Lengthwise" is selected, the display provided by the application is expanded in the lengthwise direction of a sheet. If "Widthwise" is selected, the display provided by the application is expanded in the widthwise direction of the sheet. In the example shown in FIG. 5, "Lengthwise" has been selected.

A margin setting section 32 is composed of a text box to which a numerical value can be inputted and allows an upper, lower, right, and left margins in the sheet to be set in millimeters. In the example shown in FIG. 5, the upper, lower, right, and left margins are each set at 25 mm. When an OK button 33 is tapped, a printing operation is started. When a cancel button 34 is tapped, the main window 35 is closed without executing printing. In the description below, the term "print setting" refers to the combination of settings in the printer selection section 25, port selection section 26, sheet size selection section 27, draft print selection section 28, color print selection section 29, print range selection section 30, print direction selection section 31, and margin setting section 32.

Figure 6:
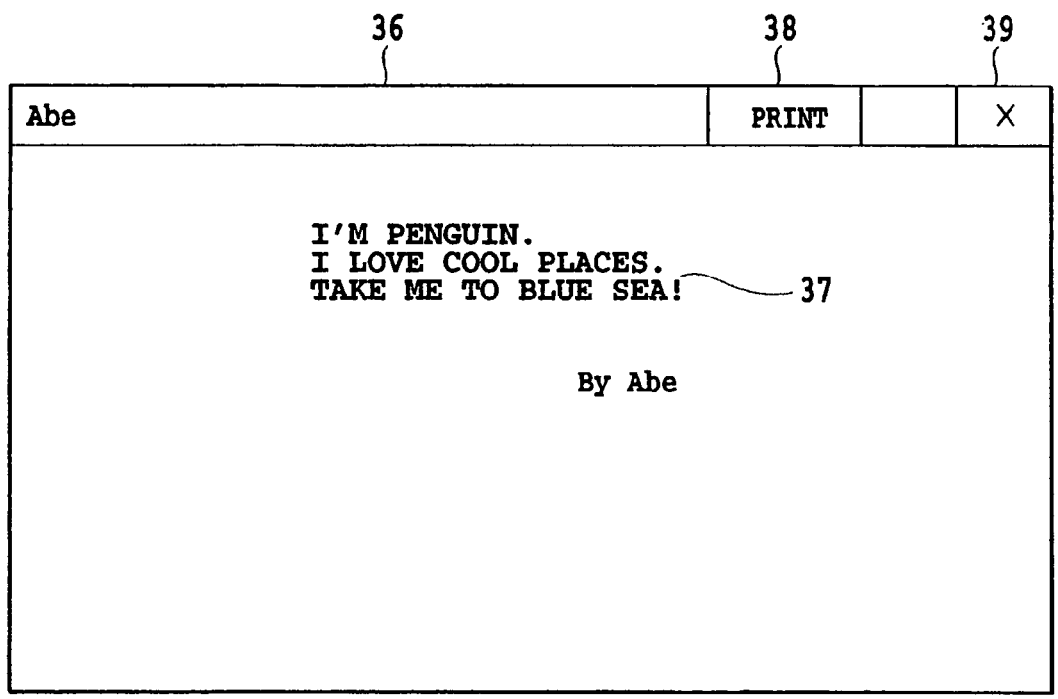
FIG. 6 is a view showing an example of a screen of an application capable of executing printing.

FIG. 6 shows an UI of an application capable of executing printing. This application is for a Japanese word processor. This figure shows that a string 37 in a main window 36 has been inputted. A print button 38 is used to start printing. Tapping the print button 38 activates the printer driver 20 to display the main window 35. Tapping the OK button 33 in the main window 35 starts printing the displayed string 37. A close button 39 is used to close this application. Tapping the close button 39 closes the main window 36 to end this application.

Figure 7:
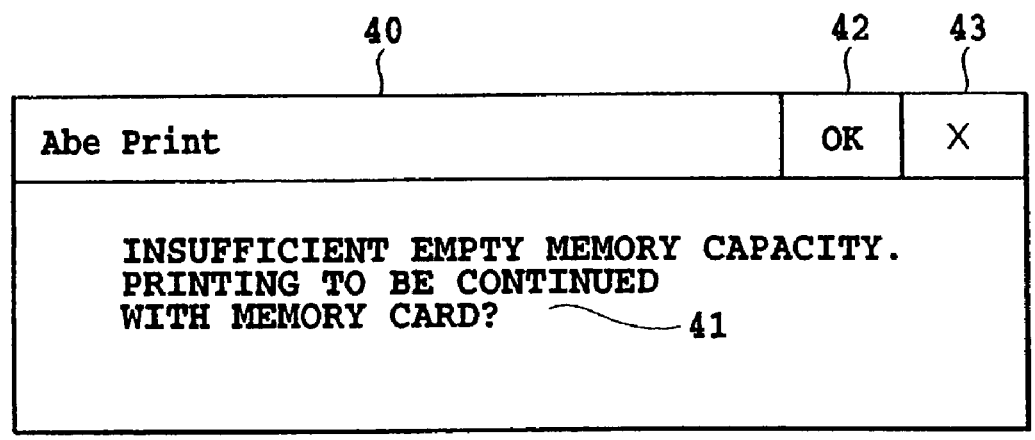
FIG. 7 is a view showing an example of a screen for an empty memory shortage message.

FIG. 7 shows an example of an UI for an empty memory shortage message. This message is displayed if an amount of memory required for spool printing cannot be obtained from the RAM 11. The empty memory shortage message 40 is composed of a message string 41, an OK button 42, and a cancel button 43. The empty memory shortage message 40 is displayed if a memory capacity required for spool printing cannot be obtained when the capacity of an empty memory (RAM 11) in the handheld computer 1 runs short. When the OK button 42 is tapped, it is checked whether or not the memory card 45 has been installed in the handheld computer 1. Then, an attempt is made to execute spool printing using the memory card 45.

When the cancel button 43 is tapped, the printing operation is halted. Even if the cancel button 43 is tapped to halt printing, the user can make another attempt to execute printing. To make another attempt to execute printing, the user sufficiently increases the capacity of the empty memory (RAM 11) by deleting unnecessary files or performing another proper operation. Then, the user taps the print button 38 to execute spool printing.

Thus, in the present embodiment, the empty memory shortage message 40 is displayed to allow the user to easily make selection as to whether or not to continue a printing operation. Thus, for example, the user can make an attempt to execute spool printing. Further, when the capacity of the empty memory in the RAM 11 or memory card 45 is insufficient, the process can be automatically switched to direct printing without displaying the empty memory shortage message 40. This eliminates the need to have the user respond to the empty memory shortage message 40. Consequently, the user can perform a printing operation more easily and efficiently.

For the application capable of executing printing, which of the above specifications is selected depends on the purpose of the application and thus does not relate to the essence of the present invention.

Figure 8:
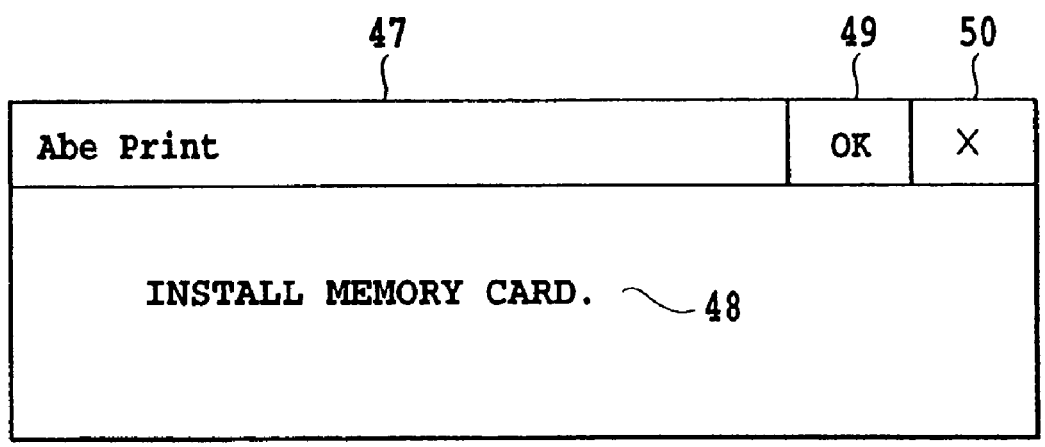
FIG. 8 is a view showing an example of a screen for a memory card install message.
Figure 9:
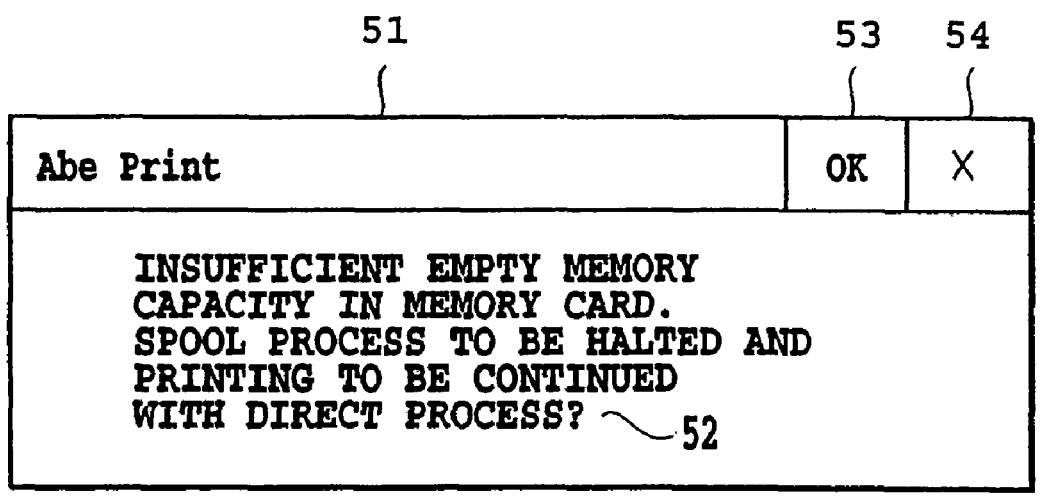
FIG. 9 is a view showing an example of a screen for an empty memory shortage message.

FIG. 8 shows an example of a UI for a memory card installation message. This message prompts the user to install the memory card 45 when it has not been installed in the handheld computer 45. The memory card installation message 47 is composed of a message string 48, an OK button 49, and a cancel button 50. The memory card installation message 47 is displayed if the memory card 45 has not been installed in the handheld computer 1 when the OK button 42 is tapped in response to the empty memory shortage message 40. When the OK button 49 is tapped, it is checked whether or not the memory card 45 has been installed. Then, an attempt is made to execute spool printing using the memory card 45. When the cancel button 50 is tapped, an empty memory shortage message 51, described later in FIG. 9, is displayed. Then, an attempt is made to execute direct printing.

FIG. 9 shows an example of a UI for an empty memory shortage message. This message is displayed if an amount of memory required for spool printing cannot be obtained from the memory card 45. The empty memory shortage message 51 is composed of a message string 52, an OK button 53, and a cancel button 54. This message is displayed if the RAM 11 in the handheld computer 1 does not have a sufficient empty area and the memory card 45 has not been installed in the handheld computer 1 or if there is not a sufficient empty area even though the memory card 45 has been installed. When the OK button 53 is tapped, direct printing is started without executing spool printing.

When the cancel button 54 is tapped, the printing operation is halted. Even if the cancel button 54 is tapped to halt printing, the user can make another attempt to execute printing. To make another attempt to execute printing, the user sufficiently increases the capacity of the empty memory (RAM 11) by deleting unnecessary files or performing another proper operation. Then, the user installs the memory card 45 provided with a sufficient empty memory in the handheld computer 1. The user then taps the print button 38 to make an attempt to execute printing. This makes it possible to execute spool printing.

Thus, in the present embodiment, the empty memory shortage message 51 is displayed to allow the user to easily make selection as to whether or not to continue a printing operation. Thus, for example, the user can make an attempt to execute spool printing. Further, when the capacity of the empty memory in the RAM 11 or memory card 45 is insufficient, the process can be automatically switched to direct printing without displaying the empty memory shortage message 51. This eliminates the need to have the user respond to the empty memory shortage message 51. Consequently, the user can perform a printing operation more easily and efficiently.

For the application capable of executing printing, which of the above specifications is selected depends on the purpose of the application and thus does not relate to the essence of the present invention.

Figure 10:
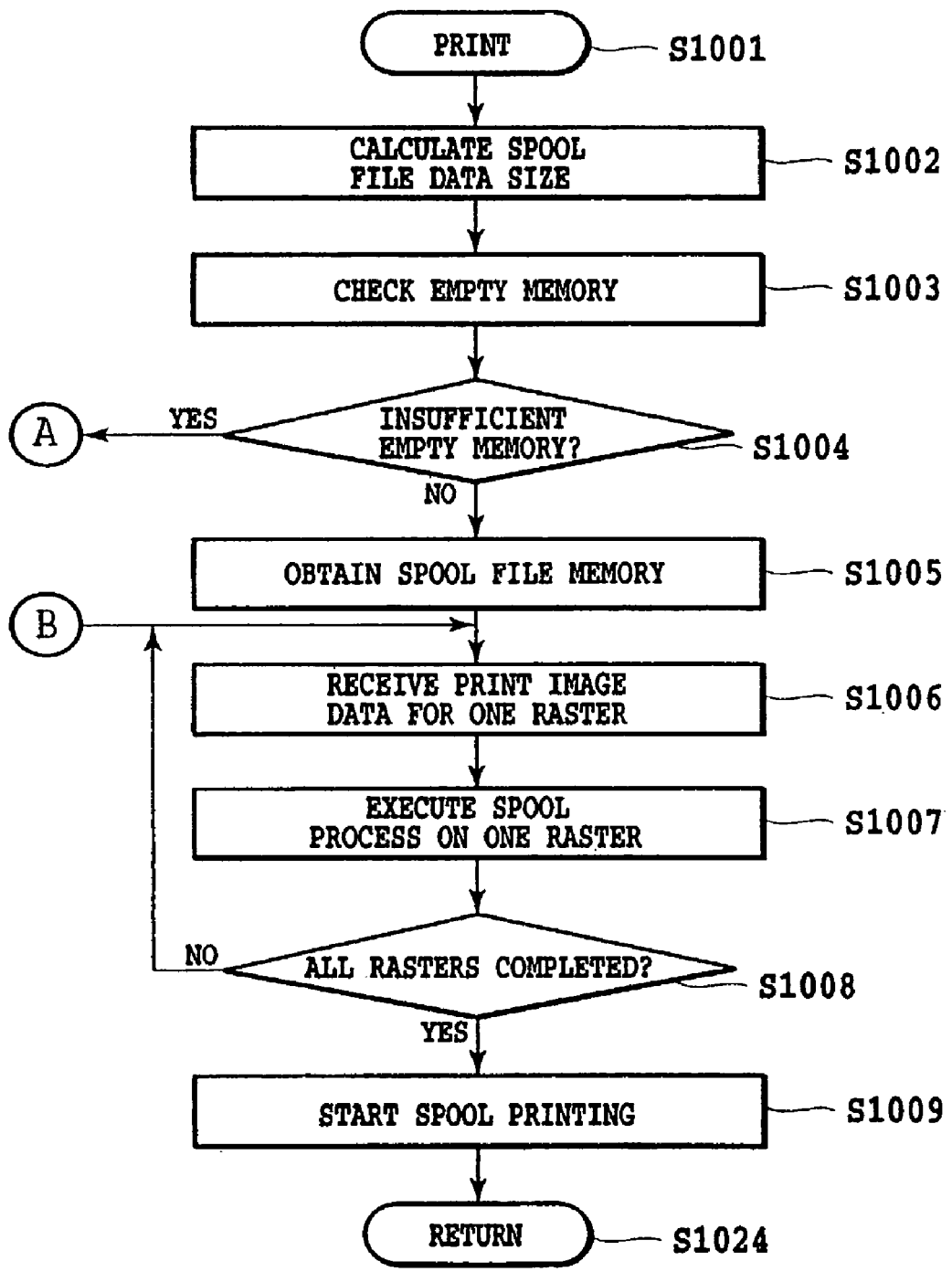
FIG. 10 is a flow chart showing an example of a printing process program stored in a ROM.
Figure 11:
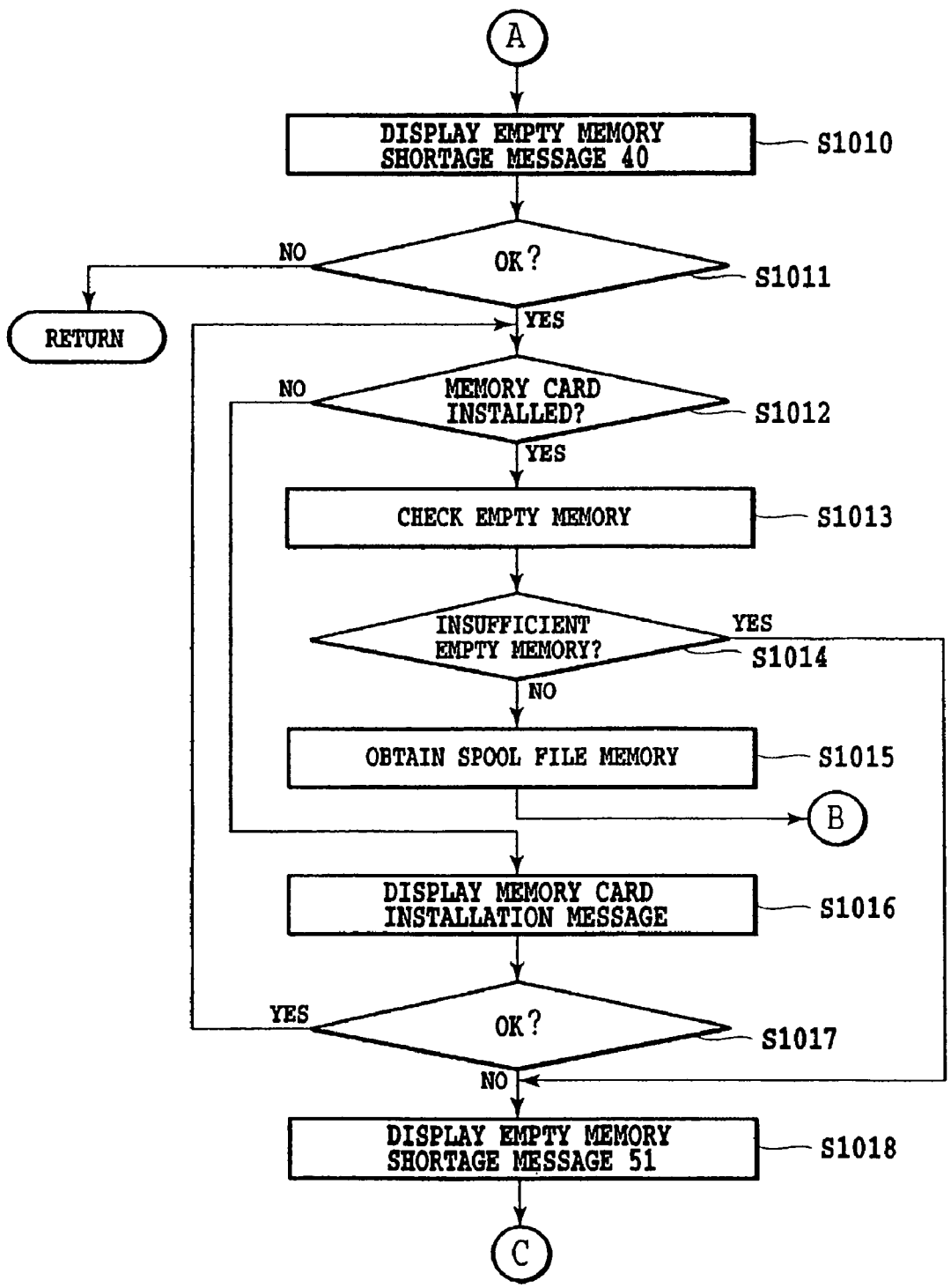
FIG. 11 is a flow chart showing an example of a printing process program stored in the ROM.
Figure 12:
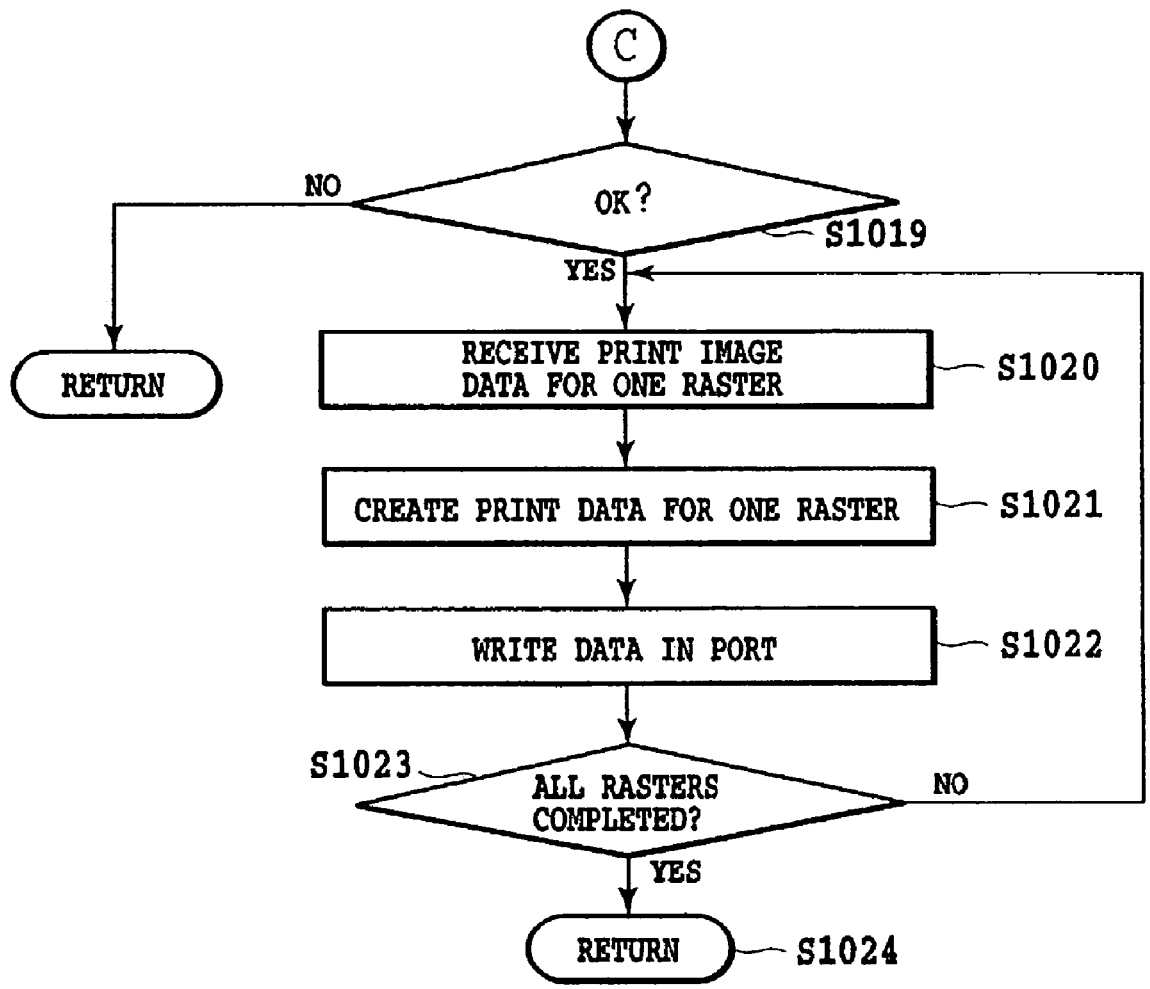
FIG. 12 is a flow chart showing an example of a printing process program stored in the ROM.

FIGS. 10 to 12 are flow charts showing an example of a printing process program stored in the ROM 10 in FIG. 3. When the OK button 33 (FIG. 5) is tapped, a printing process is started (S1001). First, the data size of a spool file used for spool printing is calculated on the basis of print data (S1002). Then, it is checked whether or not the capacity of empty memory in the data storage area in the RAM 11 is larger than the data size of this spool file (S1003). If the RAM 11 has a sufficient empty area (S1004), an area for the spool file is set in the empty area in the RAM 11 (S1005). Print image data for one raster to be printed is received from the application (S1006). A print command is added to this print image data to convert the latter into print data. The print data is then stored in the spool file (S1007).

If the application has delivered print image data for all rasters to be printed to complete a spool process (the spool file has been completed) (S1008), spool printing is started (S1009). Then, the procedure returns to the application (S1024). On the other hand, at step S1008, if spool printing has not been executed on print image data for all rasters, the procedure returns to step S1006.

At step S1004, if the capacity of the empty memory in the RAM 11 is insufficient, the empty memory shortage message 40 is displayed (S1010). If the OK button 42 is tapped (S1011), it is checked whether or not the memory card 45 has been installed in the handheld computer (S1012). If the memory card 45 has been installed in the handheld computer 1, it is checked whether or not the capacity of the empty memory in the memory card 45 is larger than the data size of the spool file (S1013).

If the memory card 45 has a sufficient capacity of empty memory (S1014), an area for the spool file is set in the empty area in the memory card 45 (S1015). Then, the procedure proceeds to step S1006 to execute a process for spool printing. On the other hand, if the memory card 45 does not have a sufficient capacity of empty memory, the empty memory shortage message 51 is displayed (S1018).

Then, it is determined whether or not the OK button 54 has been tapped (S1019). If it is determined that the OK button 53 has not been tapped, the procedure returns to the application. If it is determined that the OK button 53 has been tapped, direct printing is started to receive, from the application, print image data for one raster to be printed (S1020). A print control command is added to print image data to convert the latter into print data (S1021). The print data for one raster is written in the port control section 24 and thus transmitted to the printer (S1022).

It is determined whether or not the application has delivered print image data for all the rasters to transmit all the print data (S1023). If it is determined that all the print data has been transmitted, the procedure returns to the application (S1024). If it is determined that not all the print data has been transmitted, the procedure returns to step S1020. Direct printing starts at step S1020 and ends at step S1023.

On the other hand, at step S1019, if the cancel button 54 has been tapped, the printing process is halted and the procedure returns to the application (S1024).

On the other hand, at step S1012, if the memory card 45 has not been installed in the handheld computer 1, the memory card installation message 47 is displayed (S1016). Then, if the OK button 49 is tapped (S1017), the procedure returns to step S1012. If the cancel button 50 is tapped, the procedure proceeds to step S1018.

On the other hand, at step S1011, if the cancel button 43 is tapped, the printing process is halted and the procedure returns to the application (S1024).

For example, at step S1004, if the capacity of the empty memory in the RAM 11 is insufficient, the procedure proceeds to step S1020 by skipping steps S1010 to S1019. As described in FIGS. 7 to 9, the process is switched to direct printing without displaying the empty memory shortage message 40, memory card installation message 47, or empty memory shortage message 51. In this manner, the user need not perform an operation of responding to the empty memory shortage message 40, memory card installation message 47, or empty memory shortage message 51. Consequently, the user can perform a printing operation more easily and efficiently.

At step S1024, the procedure returns to the application. Then, the application closes the main window 35 of the printer driver 20 to release the printer driver 20. While the printer driver 20 is in operation, no operation can be performed on the application. However, once the printer driver 20 is released, arbitrary operations can be performed on the application.

Typically, a shorter time is required for writes, reads, or other accesses to the RAM 11 than for similar accesses to the memory card 45. The memory required for the spool file is obtained from the RAM 11. If the memory cannot be obtained from the RAM 11, then it is obtained from the memory card 45. This prevents a decrease in printing speed.

Figure 13:
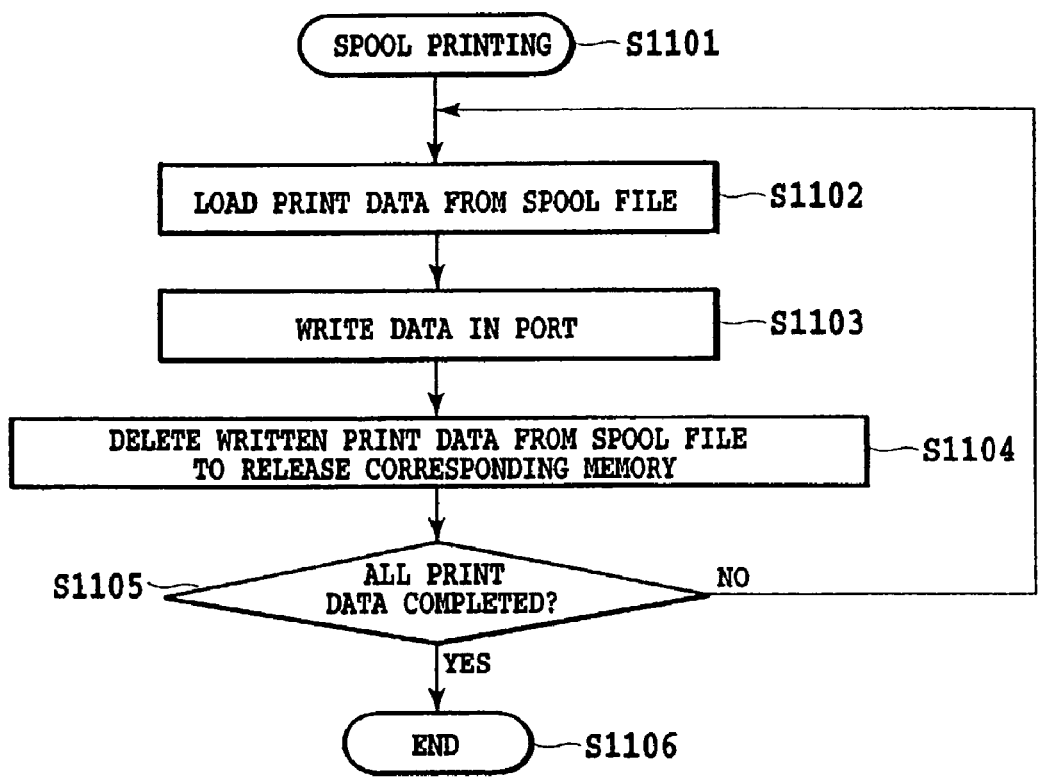
FIG. 13 is a flow chart showing an example of a spool printing process program stored in a ROM 10.

FIG. 13 is a flow chart showing an example of a spool printing process program stored in the ROM 10 in FIG. 2. At step S1009 in FIG. 10, when spool printing is started (S1101), print data is loaded from the spool file (S1102). This print data is written in the port control section 24 and thus transmitted to the printer 5 (S1103). Then, the written print data is deleted from the spool file to release the corresponding memory (RAM 11 or memory card 45) (S1104). If all the print data has been transmitted (S1105), the spool printing is ended (S1106). If not all the print data has been transmitted, the procedure returns to step S1102.

As described above, the handheld computer 1 does not comprises any mass storage devices such as a hard disk drive but comprises the RAM 11 and the memory card 45 as storage means. Accordingly, the amount of data that can be stored in the data storage area in the RAM 11 is limited. In the present embodiment, the handheld computer 1 is provided with the card slot 44 so that the arbitrarily removable memory card 45 can be installed in this card slot 44. If a spool file with a relatively large data size must be stored in the RAM 11 as in the case with a spool printing process and if the empty area in the RAM runs short, the spool file is stored in the memory card 45. In this manner, the spool file can be created to execute normal spool printing.

If the empty area in each of the RAM 11 and memory card 45 is insufficient to create a spool file, the process is switched to direct printing, which does not require the creation of a spool file. In this manner, a printing operation can be completed in every case. Direct printing can be easily accomplished simply by setting an exclusive area within the range of the empty area in the RAM 11.

Further, as long as a spool file can be created, spool printing is executed. Accordingly, a print job can be released earlier from the application. Then, arbitrary operations can be performed on the application while the print job is being executed in the background.

The empty memory shortage message 40, the memory card installation message 47, or the empty memory shortage message 51 may or may not be displayed in accordance with the purpose of the application. The system can be designed by attaching greater importance to either of the following two points: to give top priority to spool printing to allow the application to operate more easily and efficiently and to allow the user to perform a printing operation more easily and efficiently.

If the empty memory shortage message 40, the memory card installation message 47, and the empty memory shortage message 51 are displayed, the user can easily determine the status of the empty area in each of the memory (RAM 11) in the handheld computer 1 and the memory card.

In the present embodiment, the color printer 5 has been taken as an example of peripheral equipment. However, the present invention is not limited to this example but is effective on every equipment having a similar concept of spooling. Further, in the present embodiment, the ink jet-based color printer has been taken as an example. However, the present invention is not limited to this example but is of course effective on laser beam printers and monochrome printers.

In the present embodiment, print data organized using a print command that can directly control the printer 5 is written in the spool file. However, the present invention is not limited to this example. Similar effects are obtained by writing, in the spool file, an intermediate print command required for print image data delivered by the application and print data. In this case, the size of the spool file can be further reduced.

In the present embodiment, the Japanese word processor has been taken as an example of an application capable of executing printing. However, the present invention is not limited to this example but can be implemented with any application capable of executing printing. In the present embodiment, Microsoft Windows (registered trade mark) CE is used as an OS. However, the present invention is not limited to this OS but can be implemented with any OS provided that it has a similar configuration.

In the present embodiment, the USB interface is used as an interface operating between the handheld computer 1 and the printer 5. However, the present invention is not limited to this interface but can be implemented with any interface provided that it has a similar configuration.

Embodiment 2

In Embodiment 1, one spool file is created in either of the RAM 11 or the memory card 45. Direct spooling is executed if the RAM 11 does not have a sufficient empty area to create a spool file for spool printing and if the memory card 45 does not have a sufficient empty area to create a spool file for spool printing. Thus, if the memory card 45 does not have a sufficient empty area, the printing process cannot be released from the application. Disadvantageously, during this time, the application cannot be operated.

However, in actuality, the combination of the empty areas in both RAM 11 and memory card 45 often constitutes a sufficient empty area to create a spool file for spool printing. In this case, spool printing can be executed by dividing the spool file into two pieces each for the RAM 11 or the memory card 45. This enables the print job to be released from the application earlier. Thus, arbitrary operations can be performed on the application while the print job is being executed in the background.

In the example shown in Embodiment 2, spool printing is executed in this case. A printing system as a precondition is mostly configured in the same manner as that in Embodiment 1. In particular, FIGS. 1 to 9 are applicable to Embodiment 2 in the same manner as that in Embodiment 1. The printing process shown in FIGS. 10 to 12 is the same as that in Embodiment 1 except for the points shown below. Thus, its description is omitted. In Embodiment 2, in FIG. 11, it is checked whether or not the memory card 45 has been installed in the handheld computer 1 (S1012). If the memory card 45 has been installed, the capacities of the empty memories in both RAM 11 and memory card 45 are added together. It is then checked whether or not the sum is larger than the data size of the spool file (S1013). If the capacity of the empty memories in both RAM 11 and memory card 45 is sufficient (S1014), areas for the spool file in a divided file format are set in the empty areas in the RAM 11 and memory card 45 (S1015). The procedure proceeds to step S1006 to execute spool printing. At this time, the spool file area set in the RAM 11 is utilized to create a first divided file. Once this area is filled with data, the spool file area set in the memory card 45 is utilized to create a second divided file. Spool printing is executed using the spool file composed of these two divided files.

Figure 14:
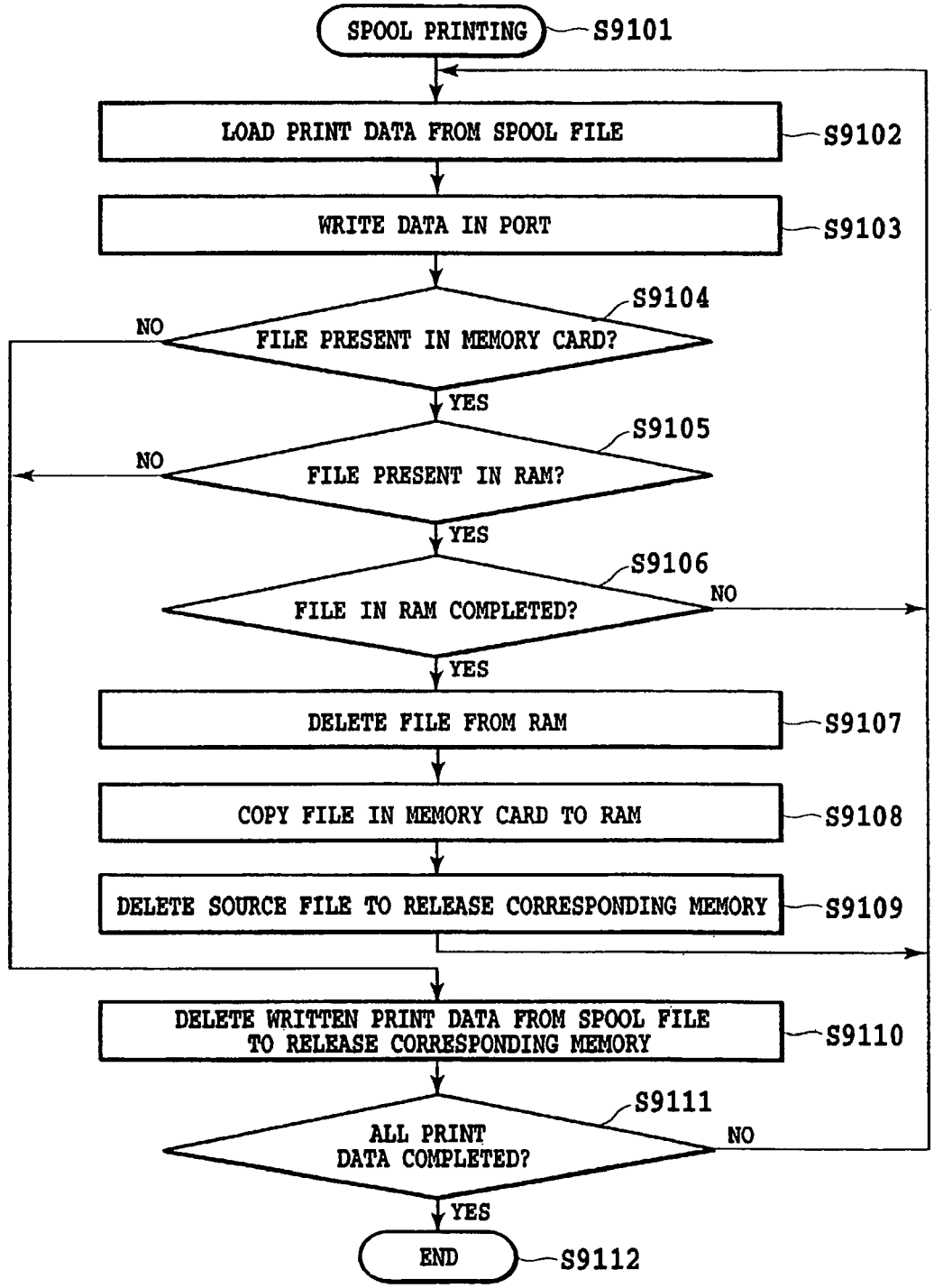
FIG. 14 is a flow chart showing an example of a spool printing process program stored in the ROM 10.

FIG. 14 is a flow chart showing an example of a spool printing process program stored in the ROM 10 in FIG. 2. At step S1009 in FIG. 10, spool printing is started (S9101). Then, print data is loaded from the spool file (S9102). This print data is written in the port control section 24 and thus transmitted to the printer (S9103).

Then, it is determined whether or not a spool file is present in the memory card 45. If it is determined that a spool file is present (S9104), then it is determined whether or not a spool file is also present in the RAM 11. If it is determined that a spool file is present in the RAM 11, then a spool printing process has already executed on the spool file in the RAM 11. If it is determined that a spool printing process has been completely executed on this spool file (S9106), the spool file is deleted from the RAM 11 (S9107).

Then, the file in the memory card 45 is copied to the RAM 11 (S9108). When the data size of the spool file memory set in the RAM 11 is larger than that in the memory card 45, the spool file in the memory card 45 is copied to the RAM 11 as it is. When the data size of the spool file memory set in the RAM 11 is smaller than that in the memory card 45, the spool file in the memory card 45 is divided into pieces. Specifically, this spool file is divided into a spool file of a size corresponding to the spool file area set in the RAM 11 and a different spool file for the remaining data. Then, the former spool file obtained by division is copied to the RAM 11.

The source file in step S9108 is deleted from the memory card 45. The memory corresponding to the deleted file is released from the memory card 45 (S9109). The procedure returns to step S9102.

On the other hand, at step S9104, if it is determined that no spool files are present in the RAM 11 or the memory card 45, the written print data is deleted from the RAM 11 or the spool file. The memory (RAM 11 or memory card 45) corresponding to the deleted file is released (S9110). Then, it is determined whether or not all the print data has been transmitted. If it is determined that all the print data has been transmitted (S9111), spool printing is ended (S9112). At step S9111, if it is determined that not all the print data has been transmitted, the procedure returns to step S9102.

At step S9105, if it is determined that no spool files are present in the RAM 11, the procedure proceeds to step S9110. At step S9106, if it is determined that a spool printing process has not completely been executed on the spool file in the RAM 11, the procedure proceeds to step S9102.

In this manner, after all the print data in the first spoon file in the RAM 11 has been printed, the second spool file in the memory card 45 or a part of the second spool file obtained by dividing this file is copied to the area for the first spool file. In this manner, the spool file in the RAM 11 takes top priority in printing. Since an access to the RAM 11 requires a shorter time than an access to the memory card 45, the printing speed can be increased.

In the present embodiment, if a spool file with a relative large data size must be stored in the RAM 11 as in the case with a spool printing process, the spool file is divided into two pieces each stored in the RAM 11 or the memory card 45 if the empty area in the RAM 11 runs short. In this manner, the spool file can be created to execute normal spool printing.

The spool file in the RAM 11 is printed first utilizing the characteristic that an access to the RAM 11 requires a shorter time than an access to the memory card 11. Subsequently, all or part of the spool file in the memory card 45 is copied to the RAM 11. The spool file in the RAM 11 takes priority over the memory card 45 in printing. Consequently, the printing speed is given top priority and can be improved.

If the empty areas in both RAM 11 and memory card 45 run short and it becomes impossible to create a spool file composed of a single file or a plurality of files obtained by division, then the process is switched to direct printing, which does not require the creation of a spool file. In this manner, a printing operation can be completed in every case. Direct printing can be easily accomplished simply by setting an exclusive area within the range of the empty area in the RAM 11.

Further, as long as a spool file can be created, spool printing is executed. Accordingly, a print job can be released earlier from the application. Then, arbitrary operations can be performed on the application while the print job is being executed in the background.

The empty memory shortage message 40, the memory card installation message 47, or the empty memory shortage message 51 may or may not be displayed in accordance with the purpose of the application. The system can be designed by attaching greater importance to either of the following two points: to give top priority to spool printing to allow the application to operate more easily and efficiently and to allow the user to perform a printing operation more easily and efficiently.

If the empty memory shortage message 40, the memory card installation message 47, and the empty memory shortage message 51 are displayed, the user can easily determine the status of the empty area in each of the memory (RAM 11) in the handheld computer 1 and the memory card.

In the present embodiment, the color printer 5 has been taken as an example of peripheral equipment. However, the present invention is not limited to this example but is effective on every equipment having a similar concept of spooling. Further, in the present embodiment, the ink jet-based color printer has been taken as an example. However, the present invention is not limited to this example but is of course effective on laser beam printers and monochrome printers.

In the present embodiment, the spool file composed of two files obtained by division has been taken as an example of a spool file in a divided file format. However, the present invention is not limited to this example. It is contemplated that in a system in which a plurality of memory cards can be installed, spool printing may be executed using a spool file composed of a plurality of files obtained by division. Such a system can be easily implemented.

In the present embodiment, print data organized using a print command that can directly control the printer 5 is written in the spool file. However, the present invention is not limited to this example. Similar effects are obtained by writing, in the spool file, an intermediate print command required for print image data delivered by the application and print data. In this case, the size of the spool file can be further reduced.

In the present embodiment, the Japanese word processor has been taken as an example of an application capable of executing printing. However, the present invention is not limited to this example but can be implemented with any application capable of executing printing. In the present embodiment, Microsoft Windows (registered trade mark) CE is used as an OS. However, the present invention is not limited to this OS but can be implemented with any OS provided that it has a similar configuration.

In the present embodiment, the USB interface is used as an interface operating between the handheld computer 1 and the printer 5. However, the present invention is not limited to this interface but can be implemented with any interface provided that it has a similar configuration.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. An information processing method in an information processing apparatus which has a first storage means as an internal storage and a connecting unit to connect a second storage means as a removable external storage having a capacity larger than a capacity of said first storage means, said method comprising:

a first determination step of determining whether or not said first storage means is used to carry out a spool printing;

a second determination step of determining, if said first determination step determines that said first storage means is not used to carry out a spool printing, whether or not said second storage means is used to carry out said spool printing, wherein an access rate of said second storage means is slower than an access rate of said first storage means; and a processing step of setting a memory required for spool printing to carry out said spool printing if said first determination step determines that said first storage means is used to carry out said spool printing or if said second determination step determines that said second storage means is used to carry out said spool printing, and of carrying out a direct printing if said second determination step determines that said second storage means is not used to carry out said spool printing, wherein said spool printing loads printing data from said memory for spool printing and writes said loaded printing data in a port, and if said printing data are present in said first and second storage means and said spool printing has been completely executed on said first storage means, said spool printing deletes said printing data from said first storage means, copies said printing data in said second storage means to said first storage means, and deletes said printing data, which is a source of the copy, from said second storage means to release said memory.

2. The information processing method according to claim 1, further comprising a display step of displaying a screen which prompts to install said second storage means if said first determination step determines that said first storage means is not used to carry out said spool printing.

3. The information processing method according to claim 1, further comprising a display step of displaying a screen which checks whether or not said direct printing is carried out if said second determination step determines that said second storage means is not used to carry out said spool printing.

4. The information processing method according to claim 1, wherein said processing step deletes the printing data in said first storage means to copy the printing data in said second storage means to said first storage means if a printing process in said spool printing for said printing data in said first storage means is ended.

5. The information processing method according to claim 1, wherein said first storage means includes a RAM, and said second storage means includes a memory card.

6. A non-transitory computer-readable storage medium storing a computer program product for causing a computer to perform a method for use in an information processing apparatus which has a first storage means as an internal storage and a connecting unit to connect a second storage means as a removable external storage having a capacity larger than a capacity of said first storage means, the method comprising:

a first determination step of determining whether or not said first storage means is used to carry out a spool printing;

a second determination step of determining, if said first determination step determines that said first storage means is not used to carry out a spool printing, whether or not said second storage means is used to carry out said spool printing, wherein an access rate of said second storage means is slower than an access rate of said first storage means; and a processing step of setting a memory required for spool printing to carry out said spool printing if said first determination step determines that said first storage means is used to carry out said spool printing or if said second determination step determines that said second storage means is used to carry out said spool printing, and of carrying out a direct printing if said second determination step determines that said second storage means is not used to carry out said spool printing, wherein said spool printing loads printing data from said memory for spool printing and writes said loaded printing data in a port, and if said printing data are present in said first and second storage means and said spool printing has been completely executed on said first storage means, said spool printing deletes said printing data from said first storage means, copies said printing data in said second storage means to said first storage means, and deletes said printing data, which is a source of the copy, from said second storage means to release said memory.

7. A non-transitory computer-readable storage medium storing a computer program product according to claim 6, said computer-executable instructions for further performing a display step of displaying a screen which prompts to install said second storage means if said first determination step determines that said first storage means is not used to carry out said spool printing.

8. A non-transitory computer-readable storage medium storing computer program product according to claim 6, said computer-executable instructions for further performing a display step of displaying a screen which checks whether or not said direct printing is carried out if said second determination step determines that said second storage means is not used to carry out said spool printing.

9. A non-transitory computer-readable storage medium storing a computer program product according to claim 6, wherein said processing step deletes the printing data in said first storage means to copy the printing data in said second storage means to said first storage means if a printing process in said spool printing for said printing data in said first storage means is ended.

10. A non-transitory computer-readable storage medium storing a computer program product according to claim 6, wherein said first storage means includes a RAM, and said second storage means includes a memory card.

11. An information processing method in an information processing apparatus, said method comprising:
a first determination step of determining whether or not a first storage unit is used to carry out a spool printing;
a displaying step of displaying a screen which checks whether or not to continue the spool printing using a second storage unit if said first determination step determines that said first storage unit is not used to carry out the spool printing;
a second determination step of determining whether or not said second storage unit has been installed;
a step of displaying a screen which prompts to install said second storage unit if said second determination step determines that said second storage unit has not been installed;
a third determination step of determining whether or not said second storage unit is used to carry out said spool printing if said second determination step determines that said second storage unit has been installed, wherein an access rate of said second storage unit is slower than an access rate of said first storage unit; and
a processing step of setting a memory required for spool printing to carry out said spool printing if said first determination step determines that said first storage unit is used to carry out said spool printing or if said third determination step determines that said second storage unit is used to carry out said spool printing, and of carrying out a direct printing if said first determination step determines that said first storage unit is not used to carry out said spool printing and if said third determination step determines that said second storage unit is not used to carry out said spool printing,
wherein said spool printing loads printing data from said memory for spool printing and writes said loaded printing data in a port, and if said printing data are present in said first and second storage units and said spool printing has been completely executed on said first storage unit, said spool printing deletes said printing data from said first storage unit, copies said printing data in said second storage unit to said first storage unit, and deletes said printing data, which is a source of the copy, from said second storage unit to release said memory.

12. An information processing apparatus which has a first storage means as an internal storage and a connecting unit to connect a second storage means as a removable external storage having a capacity larger than a capacity of said first storage means, said apparatus further comprising:
a first determination unit for determining whether or not said first storage means is used to carry out a spool printing;
a second determination unit for determining, if said first determination unit determines that said first storage means is not used to carry out a spool printing, whether or not said second storage means is used to carry out said spool printing, wherein an access rate of said second storage means is slower than an access rate of said first storage means; and
a processing unit for setting a memory required for spool printing to carry out said spool printing if said first determination unit determines that said first storage means is used to carry out said spool printing or if said second determination unit determines that said second storage means is used to carry out said spool printing, and of carrying out a direct printing if said second determination unit determines that said second storage means is not used to carry out said spool printing,
wherein said spool printing loads printing data from said memory for spool printing and writes said loaded printing data in a port, and if said printing data are present in said first and second storage means and said spool printing has been completely executed on said first storage means, said spool printing deletes said printing data from said first storage means, copies said printing data in said second storage means to said first storage means, and deletes said printing data, which is a source of the copy, from said second storage means to release said memory.

* * * * *